Nov. 26, 1968   J. KÄGI   3,413,194
NUCLEAR REACTOR AND SURROUNDING STEAM GENERATOR
Filed Feb. 21, 1967   6 Sheets-Sheet 2

Inventor:
JAKOB KÄGI
BY Kenyon & Kenyon
ATTORNEYS

Nov. 26, 1968 J. KÄGI 3,413,194
NUCLEAR REACTOR AND SURROUNDING STEAM GENERATOR
Filed Feb. 21, 1967 6 Sheets-Sheet 3

Inventor:
JAKOB KÄGI
BY
Kenyon & Kenyon
ATTORNEYS

United States Patent Office 3,413,194
Patented Nov. 26, 1968

3,413,194
NUCLEAR REACTOR AND SURROUNDING
STEAM GENERATOR
Jakob Kägi, Wiesendangen, Zurich, Switzerland, assignor to Sulzer Brothers, Limited, Wintherthur, Switzerland, a corporation of Switzerland
Filed Feb. 21, 1967, Ser. No. 617,569
Claims priority, application Switzerland, Feb. 23, 1966, 2,625/66
10 Claims. (Cl. 176—59)

ABSTRACT OF THE DISCLOSURE

The nuclear reactor plant pressure vessel houses a steam generator and a nuclear reactor in spaced relation with separating walls between the reactor and wall of the pressure vessel to define a flow duct for the reactor coolant wherein the steam generator is positioned. The coolant flows through the reactor and thence through the steam generator in a circuitous path.

Thes invention relates to a nuclear reactor plant. More particularly, the invention relates to a nuclear reactor plant having a nuclear reactor and a surrounding steam generator jacket disposed in a pressure vessel.

Nuclear reactor plants have been known wherein a steam generator and a nuclear reactor have both been disposed in the same pressure vessel within a space extending around the reactor. However, these heretofore known plants have required steam generators of complicated structures and, thus, have incurred more expensive construction costs. Furthermore, spacers have been required to separate the individual parts of the steam generator in addition to filling the spaces between these individual parts. The spacers have thus occupied a considerable amount of the cross section of the space with a consequence that the occupied space is lost for heat transmission purposes.

Accordingly, it is an object of the invention to provide a nuclear reactor plant with a steam generator of plane pipe coils.

It is another object of the invention to avoid the use of spacers in a nuclear reactor plant having a reactor and steam generator in a common pressure vessel.

It is another object of the invention to provide a nuclear reactor plant of reduced dimensions.

It is another object of the invention to direct a reactor coolant in a counterflow direction to the working medium in a steam generator of a nuclear reactor plant having a common pressure vessel for the reactor and steam generator.

Briefly, the invention provides a nuclear reactor plant having a pressure vessel housing a nuclear reactor and a steam generator with a plurality of separating walls between a wall surrounding the nuclear reactor and the interior wall of the pressure vessel. The separating walls are disposed to define a circumferentially directed flow duct for the reactor cooling gas in which the steam generator is positioned. The separating walls also define inlet and outlet ducts for the steam generator in order to conduct the cooling gas into the steam generator from the nuclear reactor and out of the steam generator to a recirculating blower.

The cooling gas for cooling the nuclear reactor is conducted through the plant in a circuitous path from the blowers through the nuclear reactor and thence through the steam generator via the inlet and outlet ducts back to the blowers. In passing through the reactor the cooling gas absorbs the heat created in the reactor so that the reactor is cooled. In passing through the steam generator the cooling gas surrenders the heat absorbed from the reactor to the working medium flowing through the steam generator so that the cooling gas is cooled for a return flow through the reactor.

These and other objects and advantages of the invention will become more apparent from the following detailed description and appended claims taken in conjunction with the accompanying drawings in which:

Figure 1:
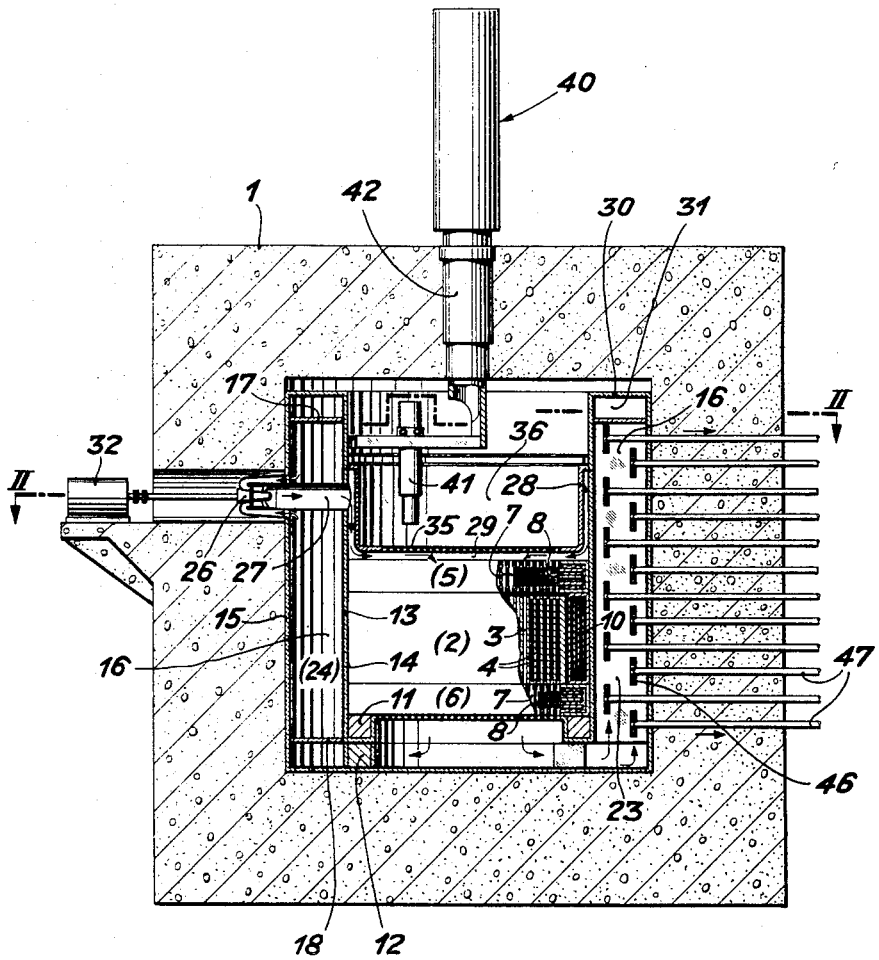
FIG. 1 illustrates a view taken on line I—I of FIG. 2 of a nuclear reactor plant having a pressure vessel housing a nuclear reactor and a steam generator.
Figure 2:
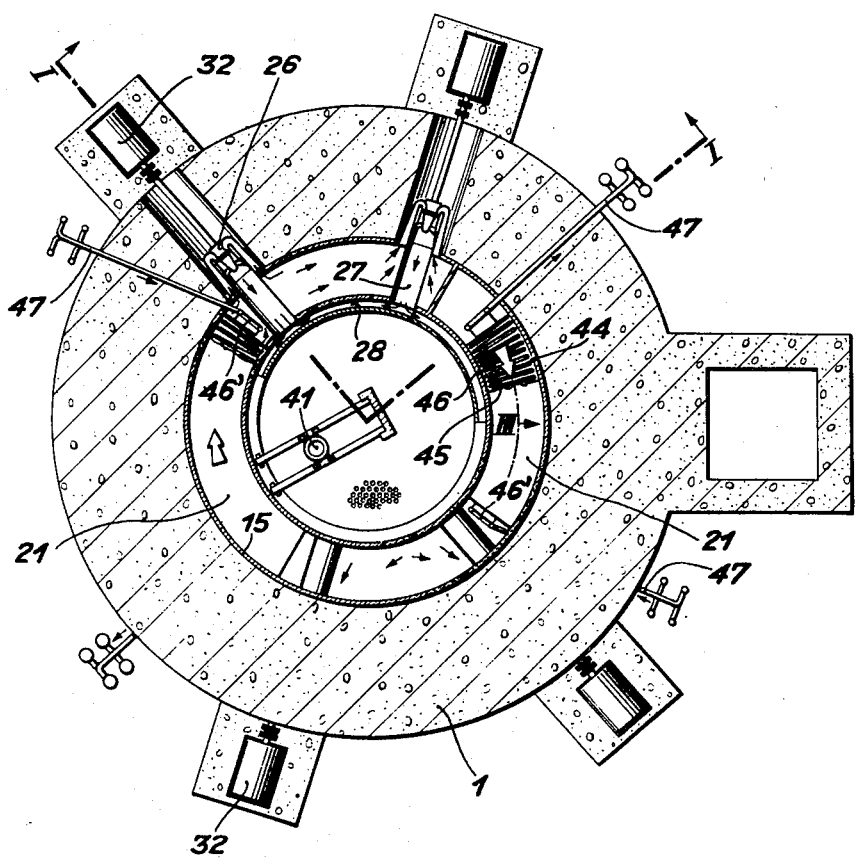
FIG. 2 illustrates a view taken on line II—II of FIG. 1.

Referring to FIGS. 1 and 2, a pressure vessel 1 houses a nuclear reactor 2 containing cooling ducts 3 in which fissionable rods 4 are disposed. A plurality of shielding plates 5, 6, for example, of laminated construction such as alternating laminae of steel and water, are disposed above and below the nuclear reactor 2. A plurality of ducts 7 extend through the shielding plates for conducting a gaseous coolant through the shielding plates; each duct 7 being provided with a shielding body 8 to prevent the egress of radiation from the reactor 2. An annular shielding 10 which is also constructed in a laminated form is provided around the circumference of the nuclear reactor 2.

The reactor 2 together with the respective shieldings 5, 6 and 10 rests upon a ring 11 which in turn bears on a plurality of spaced ring segments 12 resting on the floor of the pressure vessel 1. The reactor 2 as well as the shieldings 5, 6 and 10 is also surrounded by a cylindrical wall 13 provided with thermal insulation 14. The cylindrical wall 13 is spaced concentrically from the internal wall of the pressure vessel 1 which is lined with thermal insulation 15 to define a concentric circumferential space 16. A plurality of horizontally extending separating walls 17, 18 and vertically extending walls 20 (FIG. 3) are disposed in the space 16 between the cylindrical wall 13 and internal wall of the pressure vessel 1 in spaced relation to the floor of the pressure vessel 1 and an annular wall 30 at the top. The horizontal separating walls 17, 18 serve to define horizontal flow ducts 21 which extend circumferentially about the wall 13 of the reactor core and which receive steam generators 22, whereas the vertical separating walls 20 together with the steam generators 22 define vertical ducts 23, 24 which extend axially of the reactor core. In addition, the upper horizontal separating walls 17 and wall 30 define ducts 31 which communicate adjacent vertical ducts 24 with each other while the lower horizontal separating walls 18 and pressure vessel floor define ducts which communicate the vertical ducts 23 with each other.

A plurality of annular suction openings 25 of circulating blowers 26 are disposed in communication with the vertical ducts 24 in the internal wall of the pressure vessel 1 while a plurality of pipes 27 which pass through the suction openings 25 from the circulating blowers 26 communicate with an annular chamber 28 within the cylindrical wall 13 and a chamber 29 above the reactor 2. The coolant gas is directed by the circulating blowers 26 from the pipes 27 through the chambers 28, 29, reactor 2 and ducts 24 into the suction openings 25 for purposes of cooling the reactor 2.

The circulating blowers 26 are driven by electric motors 32 disposed outside the pressure vessel 1, for example, for ease of accessibility.

A thermally insulated stratified wall 35 is disposed above chamber 29 within chamber 28 to define a chamber 36 in which a rod changing apparatus 40 is disposed. The rod changing apparatus 40 includes a changing mechanism 41 (FIGS. 1 and 2) which is movable transversely of the chamber 36 in accordance with polar coordinates and which is adapted to pass rods through closeable openings in the wall 35. The rods are conveyed out of or into the reactor during a rod changing operation through a lock 42 (FIG. 1) positioned internally of the rod of the pressure vessel 1.

The two steam generators 22 disposed in the space 16 between wall 13 and the pressure vessel wall are preferably connected in parallel with each other and contain a plurality of parallel plane pipe coils 44 which are disposed in horizontal planes (FIG. 2) perpendicular to the axis of the reactor. Each pipe coil 44 includes a plurality of straight pipe members 45 which are interconnected by pipe bends 46 and which may be provided with circular or helical fins. The pipe coils 44 are fabricated in straight lengths, that is, with the straight pipe members 46 in parallel, and upon installation are bent into a fan pattern (FIG. 2) while utilizing the resilience of the pipe material so that the pipe members 46 extend substantially radially of the reactor axis. Each pipe coil 44 is connected at a respective end to a collecting or distributing manifold 46' which communicates with a pipe 47 extending outwardly from the reactor through the pressure vessel wall.

Figure 3:
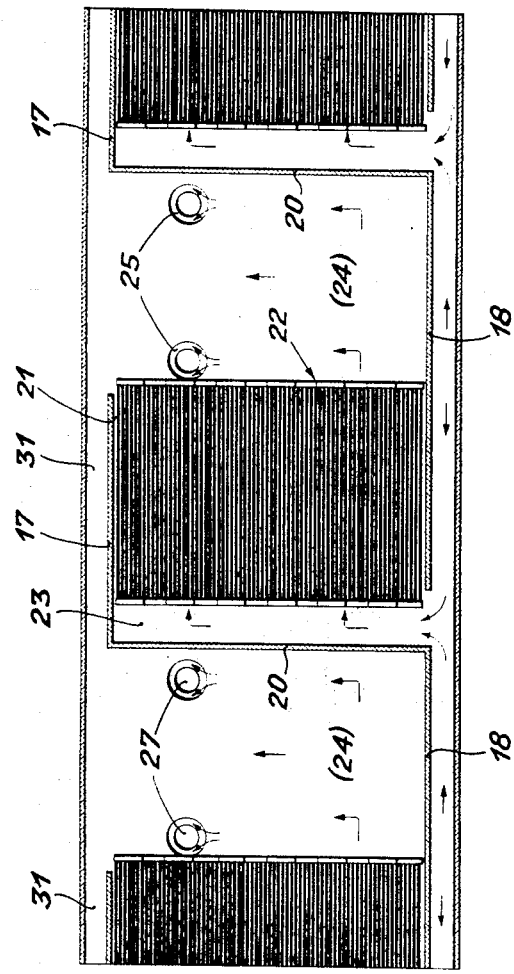
FIG. 3 illustrates a developed circumferential view from the axis of the reactor core outwardly in the direction of arrow III in FIG. 2.

Referring to FIG. 3, in operation with a working medium flowing through the steam generators 22 by way of pipes 47, cooling gas is initially directed through pipes 27 by the circulating blowers 26 into and through the chambers 28, 29 and ducts 7 of the shielding plates to pass through and cool the reactor 2. Thereafter, the cooling gas which has now been heated is directed below the reactor 2 into the duct between the pressure vessel floor and separating walls 18. The flow of cooling gas is then directed upwardly through ducts 23 to flow in a tangential direction of the reactor 2 across the pipe coils 44 of the steam generators 22. The flow of working medium in the steam generators 22 which is preferably counter to the flow of the cooling gas (from right to left as viewed in FIG. 3) thereby takes on the heat of the cooling gas absorbed from the reactor to heat the working medium and to simultaneously cool the cooling gas. The flow of cooling gas next exits from the steam generators into ducts 24 and is drawn through the suction openings 25 by the circulating blowers 26 for recirculation into the chambers 28, 29 through the pipes 27.

Figure 4:
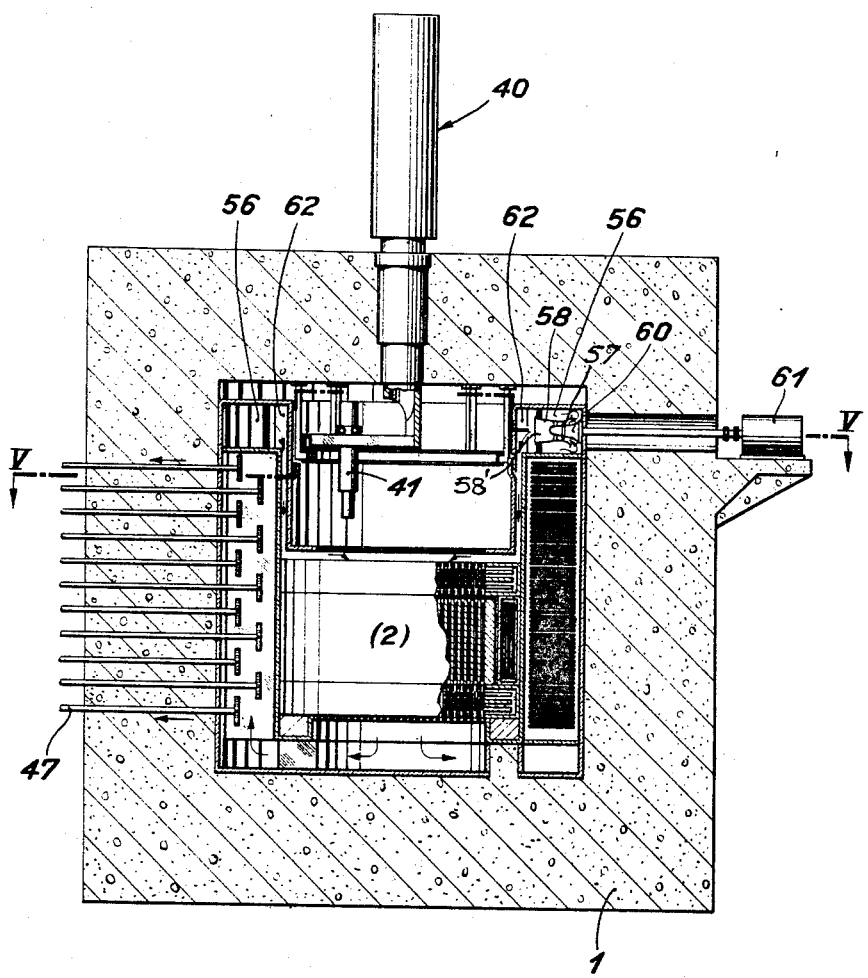
FIG. 4 illustrates a modification of the invention taken on line IV—IV of FIG. 5.
Figure 5:
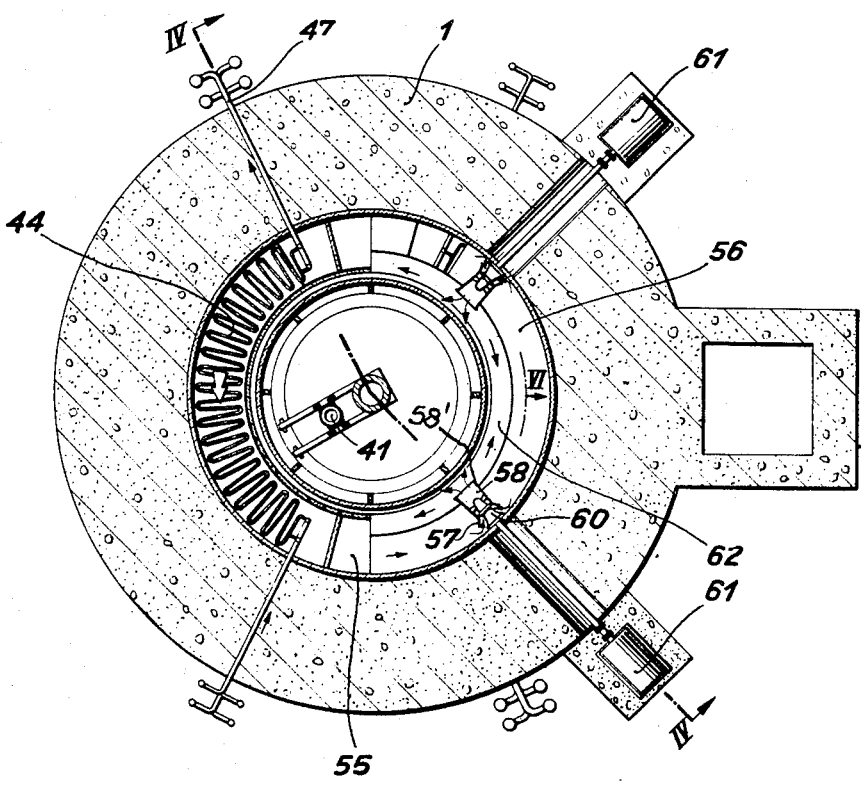
FIG. 5 illustrates a view taken on line V—V of FIG. 4.
Figure 6:
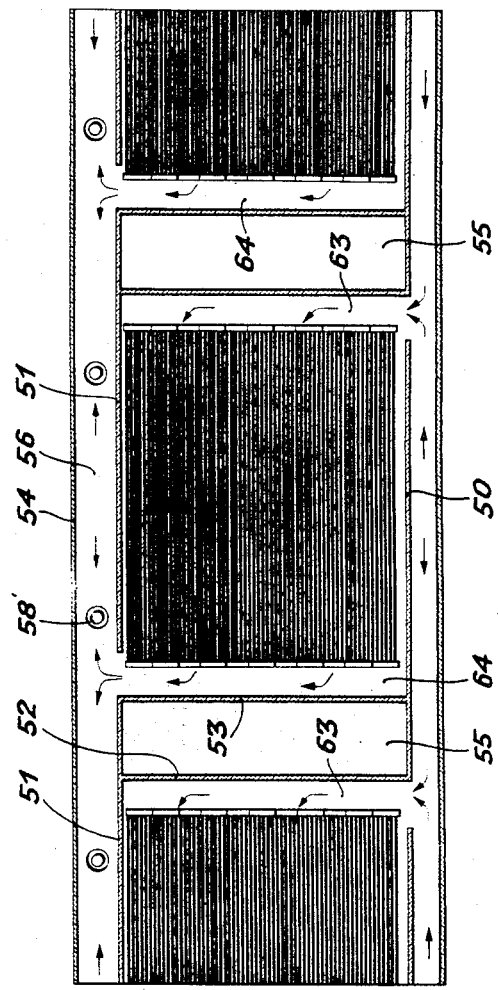
FIG. 6 illustrates a developed circumferential view from the axis of the reactor core in the direction of arrow VI in FIG. 5.

Referring to FIGS. 4, 5 and 6, wherein like reference characters are used to designate like parts as above, the circulating blowers 61 may be located on the nuclear reactor plant above the steam generators rather than in the plane of the steam generators to provide a greater utilization of the space between the reactor core and the pressure vessel.

Referring to FIG. 6, horizontal separating walls 50, 51 and vertical separating walls 52, 53 are positioned between the pressure vessel wall and the wall surrounding the reactor as above. The vertical separating walls 52, 53 are spaced to define a chamber 55 which may be utilized, for example, to accommodate auxiliary apparatus such as moderator coolers, or the extensions of various lines into and from the reactor. The vertical separating walls 52, 53 also serve to define with the adjacent steam generators, inlet ducts 63 and outlet ducts 64 which extend parallel to the reactor axis. The upper horizontal separating wall 51 together with an upper boundary wall 54, similar to wall 30 above, defines a duct 56. Circulating blowers 60 are mounted in the duct 56 for circulating cooling gas into and out of the duct 56. Each blower 60 includes an annular housing 58 in a vertical wall defining duct 56 which defines a suction opening 57 on one end and a delivery opening 58' on the opposite end. Each pair of blowers 60 is positioned above a steam generator and each blower 60 is driven by an electric motor 61. The blowers 60 direct a gas flow through the delivery opening 58' of housing 58 into a second annular chamber 62 adjacent duct 56 which communicates via chambers about the rod changing apparatus with the shielding about the reactor. The return flow of gas from the reactor passes through the steam generators into the duct 56 and from there through the suction opening 57 of the housing 58 of the blowers 60 for recirculation through the reactor.

The invention permits the employment of pipe coils for the steam generators which can be easily manufactured, namely plane and straight pipe coils which can be bent due to their resilience into a fan shape during installation. Further, the invention permits the working medium of the steam generators and the cooling gas to be directed in counter flows to each other and thus offer the known advantages of such in nuclear reactor plants.

The nuclear reactor plant of the invention functions without the use of spacers so that for a given depth of space between the nuclear reactor and pressure vessel more space is available for the steam generator and other additional apparatus than in other conventional nuclear reactor plants. Also, with given cross sections of flow ducts, the external dimensions of the reactor core and steam generator can be made smaller than otherwise. This latter feature has a particularly favorable effect on the dimensions of the pressure vessel.

Because two or more steam generators are disposed on the circumference of the nuclear reactor, the reactor cooling gas passes through a shorter flow path while a greater overall flow cross section of the ducts is provided. Further, in the event of a disturbance or defect, it is possible to shut down one of the steam generators while continuing at a reduced rating with the remaining steam generator. Likewise, since the circulating blowers draw the cooling gas from chambers which communicate with each other, it is possible in the event of failure of one of the blowers to continue operation with the remaining blowers.

Having thus described the invention, it is not intended that it be so limited as changes may be readily made therein without departing from the scope of the invention. Accordingly, it is intended that the foregoing Abstract of the Disclosure, and the subject matter described above and shown in the drawings be interpreted as illustrative and not in a limiting sense.

What is claimed is:

1. A nuclear reactor plant comprising
 a pressure vessel having an internal wall,
 a nuclear reactor within said pressure vessel supported in spaced relation thereto,
 a wall surrounding said nuclear reactor in spaced relation to said internal wall to form a peripheral space therebetween for passage of a cooling gas therethrough,
 a plurality of separating walls between said wall and internal wall forming at least one circumferentially directed flow duct for passing the cooling gas therethrough circumferentially of said reactor,
 a steam generator disposed in said flow duct, and
 means for circulating a coolant through said reactor and steam generator.

2. A nuclear reactor plant as set forth in claim 1 wherein said plurality of separating walls includes separating walls disposed in planes perpendicular to the axis of said reactor.

3. A nuclear reactor plant as set forth in claim 1 wherein said plurality of separating walls includes separating walls disposed parallel to the axis of said reactor to define at least one flow duct with said steam generator.

4. A nuclear reactor plant as set forth in claim 1 wherein said plurality of separating walls includes at least two separating walls disposed parallel to the axis of said reactor in spaced relation to each other to define a chamber therebetween and to define an inlet duct to said steam generator and an outlet duct from said steam generator.

5. A nuclear reactor plant as set forth in claim 1 wherein said means includes at least one circulating blower having a delivery opening disposed in communication with the interior of said wall surrounding said nuclear reactor to direct a cooling gas through said nuclear reactor and a suction opening in communication with said flow duct to draw cooling gas from said steam generator for recirculation into said nuclear reactor.

6. A nuclear reactor plant as set forth in claim 1 wherein said plurality of separating walls form at least two circumferentially directed flow ducts and a steam generator is disposed in each said flow duct.

7. A nuclear reactor plant as set forth in claim 6 wherein said separating walls includes a pair of separating walls disposed in spaced planes perpendicular to the axis of said reactor to define each said circumferentially directed flow duct; and a separating wall disposed parallel to the axis of said reactor connecting one of the perpendicularly disposed walls defining one of said circumferentially directed flow ducts with a perpendicularly disposed wall in a spaced plane defining an adjacent circumferentially directed flow duct, each said parallelly disposed separating wall being spaced from adjacent steam generators to define an inlet flow duct to one side of a steam generator and an outlet flow duct to an opposite side of the adjacent steam generator.

8. A nuclear reactor plant as set forth in claim 7 further comprising a first annular chamber communicating with each outlet flow duct and a second annular chamber adjacent said first annular chamber communicating with said nuclear reactor, and said means for circulating a coolant includes at least one circulating blower having a housing disposed between said annular chambers with a delivery opening in said second annular chamber for directing coolant thereinto and a suction opening in said first annular chamber for drawing coolant therefrom.

9. A nuclear reactor plant as set forth in claim 8 wherein each said circulating blower is disposed above a steam generator.

10. A nuclear reactor plant as set forth in claim 1 wherein each steam generator includes a plurality of pipe coils disposed in planes perpendicular to the axis of said reactor, each pipe coil including a plurality of straight pipe members disposed substantially radially of the axis of said reactor and a plurality of pipe bends interconnecting said straight pipe members.

References Cited

UNITED STATES PATENTS

| | | |
|---|---|---|
| 3,227,620 | 1/1966 | Cutts et al. |
| 3,249,507 | 5/1966 | Gondoin et al. |
| 3,296,082 | 1/1967 | Lemesle et al. |
| 3,365,366 | 1/1968 | Cundill. |

REUBEN EPSTEIN, *Primary Examiner.*